W. H. BOWMAN.
Cotton-Planter.
No. 200,968. Patented March 5, 1878.
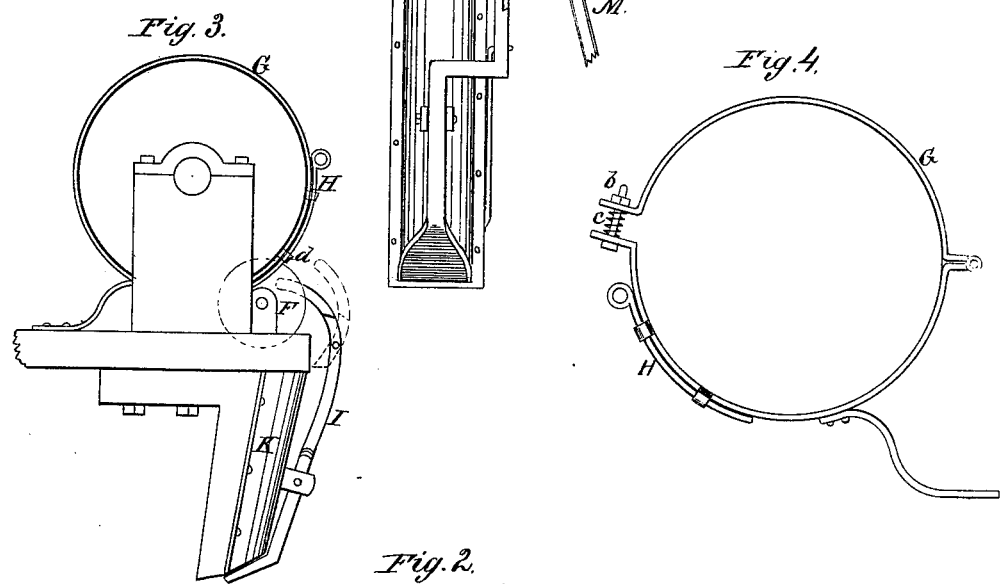
WITNESSES:
INVENTOR:
Wm. H. Bowman
BY
ATTORNEYS.
N. PETERS, PHOTO-LITHOGRAPHER, WASHINGTON, D.C.

UNITED STATES PATENT OFFICE.

WILLIAM H. BOWMAN, OF SOUTH SOLON, OHIO, ASSIGNOR OF ONE-HALF HIS RIGHT TO JOHN C. HAYS, OF SAME PLACE.

IMPROVEMENT IN COTTON-PLANTERS.

Specification forming part of Letters Patent No. 200,968, dated March 5, 1878; application filed October 19, 1877.

*To all whom it may concern:*

Be it known that I, WILLIAM H. BOWMAN, of South Solon, in the county of Madison and State of Ohio, have invented a new and Improved Cotton-Planter; and I do hereby declare that the following is a full, clear, and exact description of the same.

The revolving seed-hoppers of cotton-planters tend to carry too much seed away from the discharge slot or opening in the band encircling them. The consequence is, that the seed is not discharged evenly or at a uniform rate, and the resulting crop is not properly distributed over the field. To remedy this defect I construct a double conical hopper in two parts, which revolve in opposite directions, one tending to carry the seed away and the other to carry it back to the discharge-opening, thus agitating the seed, and causing it to concentrate at the place of delivery, so that the seed-wheel will draw it out and distribute it in uniform quantities.

The invention further relates to the construction of a band which encircles the hopper, the same being made in two parts, hinged together at one side, and detachably and adjustably connected at the other, to allow the cones to be removed or the band to be tightened and held in contact with the cones by an elastic pressure.

In the accompanying drawing, forming part of this specification, Figure 1 is a rear elevation of a hopper and its attachments and connected parts constructed and arranged according to my invention. Fig. 2 is a longitudinal section of the hopper. Fig. 3 is an end view. Fig. 4 is a detail view of the hopper-band detached.

The seed-hopper consists of two hollow cones, A A', placed with their bases opposite and near each other. These parts are mounted on different, but concentric, shafts. The part A has a tubular projection, $a$, by which it is keyed on one end of a solid shaft, B. The other part, A', is mounted on, or formed solid with, a short tubular shaft, B', through which the long solid shaft B passes. The adjacent ends of the respective shafts B B' are provided with different-sized gear-wheels C C', which mesh with separate pinions D D' on the counter-shaft E, upon which the toothed seed-discharge wheel F is mounted. By this arrangement, upon rotary motion being imparted to the shaft E, (by means of any suitable connection with the axle or transporting-wheels of the planter,) the two parts of the hopper will be rotated simultaneously in opposite directions, thus setting up two opposed currents in the seed, violently agitating it, and causing it to concentrate at the discharge-opening, so that it will be drawn out and distributed evenly by the seed-wheel F.

It will be noted that the meshing gears are located at one end of the double conical hopper, which is the most simple and economical arrangement, and enables the hopper to be operated with less friction than would be practicable if the solid shaft B and counter-shaft E were extended and provided with meshing gears at each end of the hopper.

A band, G, encircles the middle of the hopper A A'. The same is divided transversely, and hence consists of two parts or halves, Fig. 4, which are hinged together on one side, and detachably connected at the other by means of a screw, $b$, around which a spiral spring, $c$, is coiled, to hold the free ends of the band apart so far as the screw will allow. This construction enables the upper half of the band to be thrown back, when required, to allow removal of the cones A A', and also enables the band to be contracted around the cones, to cause it to fit the same sufficiently close to prevent the escape of seed except through the slot in the lower half of the band.

H is a slide, by adjustment of which the discharge of seed may be regulated. The slide is made of spring-steel, and is held by friction in guide-flanges $d$ of the band, so that it may be adjusted, and will remain fixed in any adjustment without the aid of a screw or other device, such as is ordinarily used in connection with seed-slides. The slide can therefore be adjusted very quickly without requiring the operation of the machine to be stopped.

The seed-discharge wheel F is made double, and the two parts are made adjustable on the shaft, and held apart by the elastic pressure of a spiral spring, $e$.

When I desire to deposit seed in hills, I use what I term a "hilling attachment," consisting of a lever, I, having a foot, which closes the discharge end of the seed-spout K. The lever is operated intermittingly, to allow the escape of seed from the spout, by means of a wheel, L, having a lug or stud, $i$, projecting from one side thereof. The upper end of the lever I is jointed, to allow the wheel L to rotate backward without breaking the lever.

The speed of the rotation of the hopper is regulated by the rotation of a wheel (not shown) running on the ground, and communicating motion to the shaft M.

What I claim is—

1. In a seed-planter, serrated seed-discharge wheel F, made in two parts, mounted adjustably on the shaft, and the interposed spiral spring, as shown and described.

2. In a seed-planter, the hopper formed of two cones placed with their bases together, and arranged to revolve in opposite directions, substantially as shown and described.

3. In a seed-planter, the two cones A A', the concentric solid and hollow shafts B B', the gears C C', pinions D D', and the counter-shaft E, all combined and arranged as shown and described, to operate as specified.

4. In a seed-planter, the combination, with the band made in two parts, hinged together, of the spring and screw-fastening, substantially as shown and described.

The above specification of my invention signed by me this 3d day of September, 1877.

WILLIAM H. BOWMAN.

Witnesses:
 A. SIMMONS,
 BENJMIN HODGES.